No. 718,744. PATENTED JAN. 20, 1903.
A. E. WHITE.
NUT LOCK AND GUARD.
APPLICATION FILED MAR. 5, 1902.
NO MODEL.

Witnesses:
Lynn A. Williams
Isabel E. Lee

Inventor:
Arthur E. White.
By A. Miller Belfield
Attorney

UNITED STATES PATENT OFFICE.

ARTHUR E. WHITE, OF CHICAGO, ILLINOIS.

NUT LOCK AND GUARD.

SPECIFICATION forming part of Letters Patent No. 718,744, dated January 20, 1903.

Application filed March 5, 1902. Serial No. 96,831. (No model.)

*To all whom it may concern:*

Be it known that I, ARTHUR E. WHITE, a citizen of the United States, residing at Chicago, in the county of Cook and State of Illinois, have invented a certain new and useful Improvement in Nut Locks and Guards, (Case No. 1,) of which the following is a full, clear, concise, and exact description, reference being had to the accompanying drawings, forming a part of this specification.

My invention contemplates the provision of a device by which the end of a bolt and the nut thereon can be covered properly to prevent their interfering with passing objects or persons and also by which the nut can be held against rotation on the bolt in a simple and effective manner.

In the device I have herein shown for carrying out my invention I arrange a structure having two recesses, one of which has the configuration of the nut, so as to fit closely thereupon, and the other of which has the configuration of the end portion of the bolt projecting from the nut, so that this end portion of the bolt fits closely in such recess. The device is comparatively thin, being but little more than the width of the nut and the projecting end portion of the bolt, in which way no appreciable obstacle is presented. The exterior desirably has a curved configuration, so as to present no corners.

I desirably arrange the device in a cavity in the support, through which the bolt passes, whereby the projecting portion of the device is reduced to a minimum. The end portion of the nut guard and lock desirably has a curvature, making it substantially flush with the adjacent portions of the support.

Figure 1:
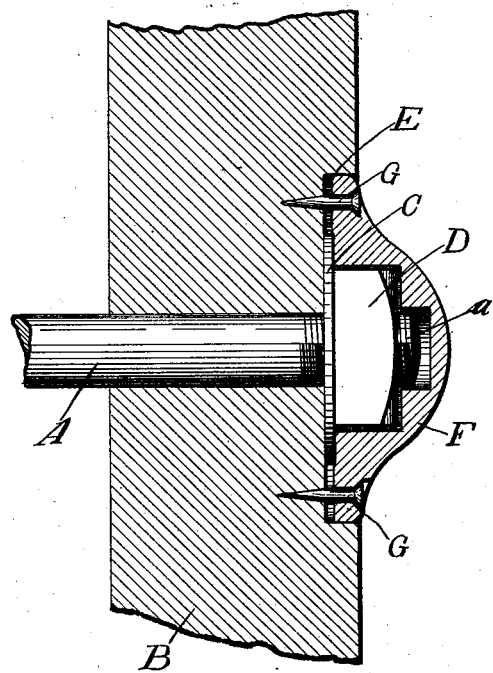
Figure 3:
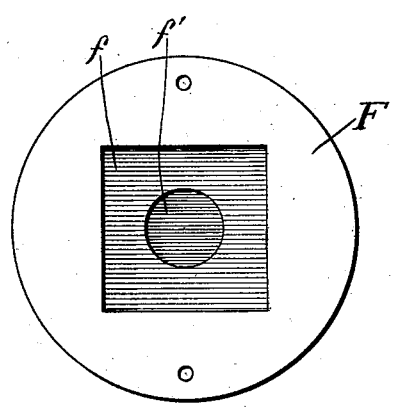
Figure 2:
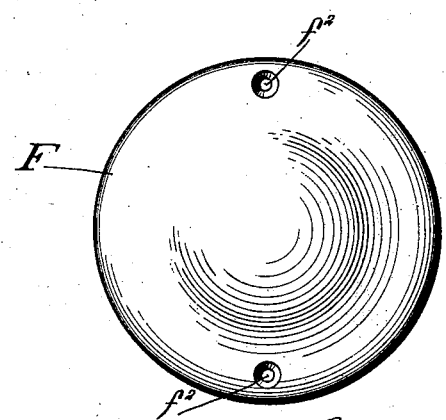

In the accompanying drawings, Figure 1 is a view showing a bolt and a washer and nut thereon in elevation and a support for the bolt and a nut lock and guard embodying my invention in section. Fig. 2 is a view of the front face of my nut lock and guard. Fig. 3 is a view of the rear face of the same.

In the drawings I have shown a bolt A extended through a support B, and a washer C and nut D on the threaded end of the bolt. The support B desirably has a cavity or recess E on the side through which the threaded end of the bolt projects.

I have shown a nut lock and guard F embodying my invention arranged over the nut D and a small end portion $a$ of the bolt A projecting from the outside of the nut D. The guard F is desirably made circular, as shown in Figs. 2 and 3, and thicker in its central portion and reduced toward its periphery, as shown in Fig. 1. It is provided with two cavities $f$ and $f'$, whereof the cavity $f$ is substantially the size and contour of the nut D and the cavity $f'$ substantially the size and contour of the projecting portion $a$ of the bolt A. The guard fits desirably upon the washer C and is provided with apertures $f^2 f^2$, through which screws G G are passed to fasten the guard in position. By thus providing the guard with the two cavities having substantially the size and contour of the nut and projecting end portion of the bolt the nut can be firmly and rigidly held against rotation, so that the device acts as a nut-lock, and at the same time the size of the device is reduced to a minimum, there being no intervening space between the outside of the nut and the portion of the guard adjacent thereto. Furthermore, the curved contour of the outside of the device causes the same to project the minimum amount and allows its peripheral portion to become substantially flush with the edge portion of the support B.

The device is simple and effective and can be made at low expense and is adapted for application to various articles, especially articles of furniture where it is desired to cover the ends of the bolts and also to lock the nuts, and to do this in as simple a manner as possible.

What I claim as my invention is—

A nut lock and guard comprising a cap F having two chambers $f, f'$, whereof the chamber $f$ is substantially the size and contour of the nut, and the chamber $f'$ is substantially the size and contour of the end portion of the bolt projecting from the nut, the said cap also having apertures $f^2$ for screws and being made thicker at its middle portion than at its outer edge, whereby the cap can be rigidly attached to the body through which the bolt passes, and the nut will thereby be locked, substantially as described.

In witness whereof I hereunto subscribe my name this 3d day of March, A. D. 1902.

ARTHUR E. WHITE.

Witnesses:
A. MILLER BELFIELD,
GEORGE L. CRAGG.